March 15, 1966     E. N. LAPANSIE     3,240,408
TRAILER-CONTAINER SYSTEM
Filed Oct. 9, 1963     2 Sheets-Sheet 1
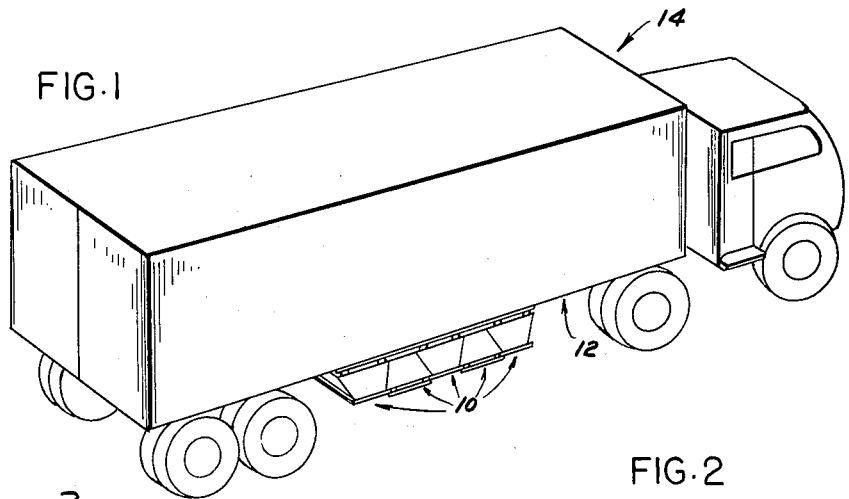
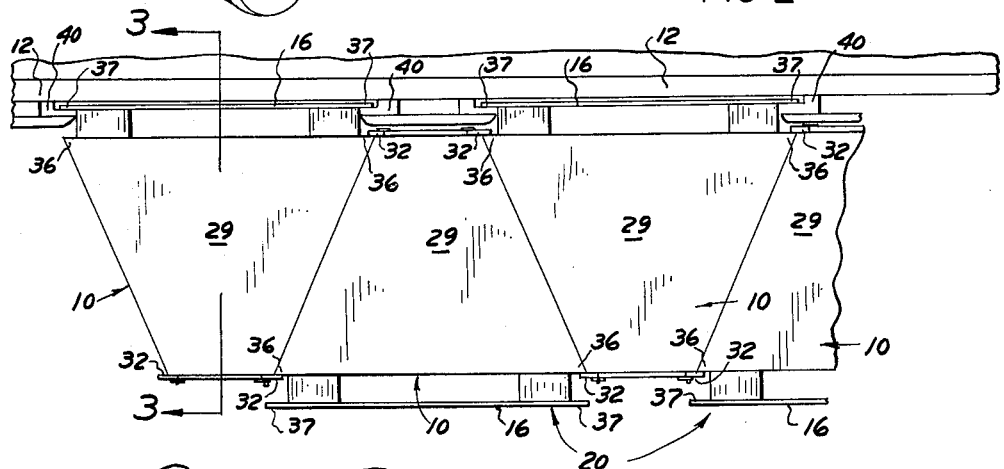
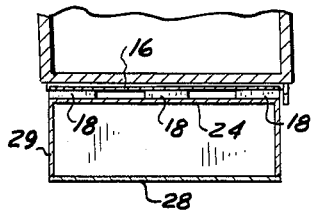
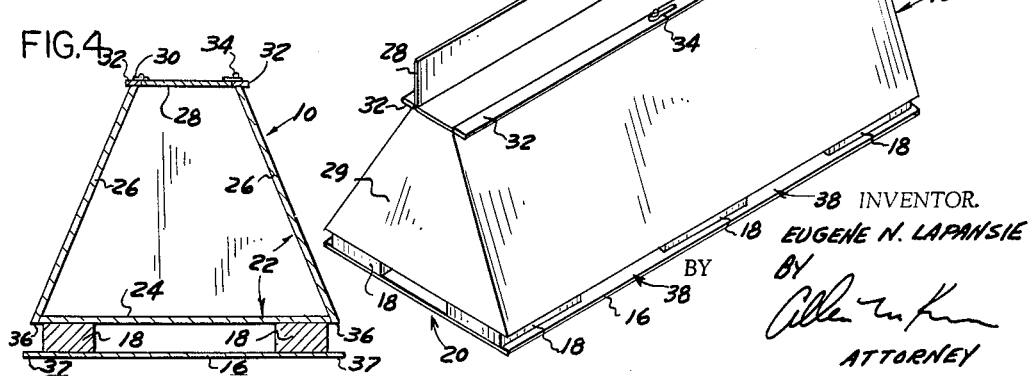
INVENTOR.
EUGENE N. LAPANSIE
BY
ATTORNEY March 15, 1966  E. N. LAPANSIE  3,240,408
TRAILER-CONTAINER SYSTEM
Filed Oct. 9, 1963  2 Sheets-Sheet 2
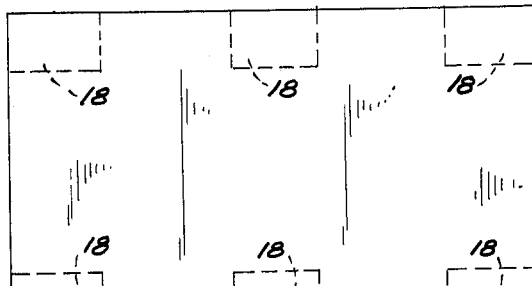
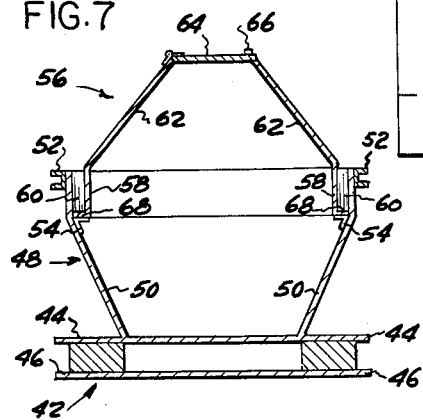
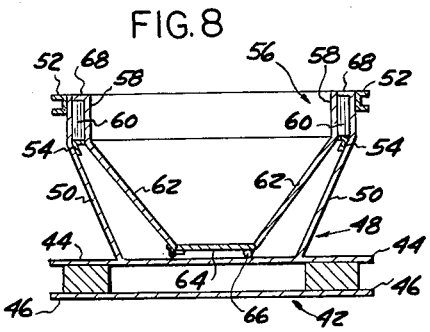
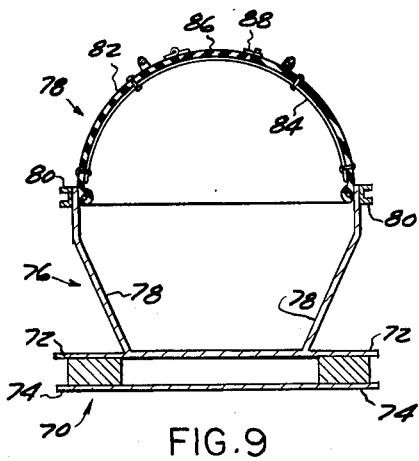
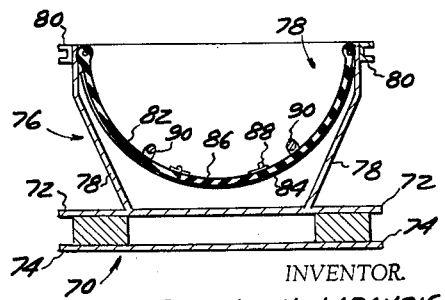
INVENTOR.
EUGENE N. LAPANSIE
BY
ATTORNEY

United States Patent Office 3,240,408
Patented Mar. 15, 1966

3,240,408
TRAILER-CONTAINER SYSTEM
Eugene N. Lapansie, 852 Canterbury,
Grosse Pointe Woods, Mich.
Filed Oct. 9, 1963, Ser. No. 314,943
14 Claims. (Cl. 224—42.41)

This invention relates to containers to be employed in conjunction with conventional load-carrying vehicles such as trucks or trailers, and more particularly has reference to a system of such containers which permits the transport of granular material and the like during the normally empty return trip of the vehicle.

To decrease the cost of transporting freight on vehicles such as trailers and trucks, it is desirable to utilize the vehicle to carry some type of freight on its return trip. Frequently the freight which may be transported on the return trip is composed of a granular or liquid material which it is undesirable to carry in direct bulk form. If the ordinary freight shipped in the vehicle is of a different type, such as finished products in cartons, some means must be provided for storage of the containers so as not to decrease the normal freight storage capacity of the vehicle.

The present invention contemplates a system of containers which may be used to store granular or liquid material during the return trip yet is adaptable to be carried exteriorly of the vehicle storage area during the direct freight-carrying trip. The invention contemplates a system of containers which may be locked in place below the floor of the trailer during the primary freight-carrying trip. The containers may later be removed, filled with the granular or liquid material, and placed in the interior of the trailer for the return trip.

In a preferred embodiment of the present invention which will be subsequently described in detail, each container comprises an elongated enclosure, narrower at the top than at the bottom. A hinged lid at the top permits the freight material to be poured into the container. Spaced parallel angle bars fixed to the bottom of the trailer project downwardly and are adapted to support a shoulder projecting laterally at the bottom of each side of the container. A pair of empty containers is inverted and mounted in the angle bars; a third container is mounted upright directly between the first two containers, a projection portion of the lid of the inverted containers then supporting a projection portion at the wide section of the third container. In this manner, all the containers may be stored below the floor of the trailer. Horizontal slots are provided at the bottom of each container and spaced such that the containers may be lifted and moved about by means of a conventional fork-lift truck.

Other embodiments of the container which will also be subsequently described in detail employ a base portion similar to that described above but include an upper lid which may be inverted and placed in the base portion, or may be simply pushed down into the base portion. An advantage of this construction is that it permits the container to have a large storage capacity yet be substantially compact when stored below the trailer floor.

It is therefore a primary object of the present invention to provide a container for storage of granular or liquid material which may be placed in the interior of a trailer during use but may be stored exteriorly of the trailer space while not in use.

A further object is to provide a system of containers of this type which may be easily used for transport of freight material and may be quickly removed to a storage position while not in use.

Another object is to provide containers of this type which may be lifted and transported on conventional fork-lift vehicles.

Another object is to provide containers of this kind which eliminate air spaces or pockets when loaded with material so as to prevent the accumulation of moisture or dust during transport, and which are adaptable to be aerated and manifolded if desired.

Another object is to provide a system of containers of this type which is simple in construction, economical to manufacture, and convenient to install and use.

Other objects and advantages of the present invention will be more readily apparent from the following detailed description of several preferred embodiments of the invention. The description makes reference to the drawings in which:

FIGURE 1 is a perspective view of a truck having containers according to a first embodiment of the present invention mounted below the floor of the trailer for storage;

FIGURE 2 is an end detail view of three of the containers shown in FIG. 1;

FIG. 3 is a reduced sectional detail view taken along the lines 3—3 in FIG. 2;

FIG. 4 is a sectional view taken through one of the containers shown in the preceding figures;

FIGURE 5 is a perspective view of the embodiment of the container shown in the preceding figures with the lid in open position.

FIGURE 6 is a bottom view of the container shown in the preceding figures;

FIGURE 7 is a sectional view taken through a second embodiment of the container of the present invention;

FIGURE 8 is a view similar to that of FIG. 7 showing the upper portion of the container inverted in storage position;

FIGURE 9 is a sectional view through a third embodiment of the container of the present invention; and FIGURE 10 is a view similar to that of FIG. 9 showing the upper portion of the container pushed down into the lower section for storage.

Referring to the drawings in detail, FIGURE 1 shows containers 10 constructed according to a first embodiment of the present invention, in storage position below the floor 12 of a conventional trailer 14.

FIGURES 2–6 illustrate the structure of this embodiment of the container 10. A rectangular base portion 16 having rectangular blocks 18 fixed to its corners and to the midpoints of its long sides, forms a pallet portion 20.

A closed trapezoidal housing 22 is fixed to the surface of the blocks 18 and consists of a base 24, diagonal sides 26, a lid 28 and vertical ends 29. The lid 28 is mounted on a hinge 30 so that it can be rotated to the open position shown in FIG. 5. Lips 32 project outwardly from the edge of the lid at both long edges thereof. A lock member 34 is mounted on one lip and may be rotated so as to lock the lid in place when the latter is in closed position.

The blocks 18 are fixed to the base 24 and the base portion 16 slightly removed from the edges of the latter members so as to create projecting shoulders 36 and 37 respectively about the lower edge of the housing 22 and at the edge of the base portion 16. The blocks are spaced upon the base along the length of the container so as to create a pair of lateral slots 38 which are spaced apart so as to correspond to the spacing of the forks in a conventional fork-lift vehicle. Thus the container 10 is adapted to be conveniently lifted and transported about by a conventional fork-lift truck.

Slide rails 40 mounted in pairs in parallel fashion below the floor 12 of the trailer 14 and extending transversely to the length of the trailer, are comprised of angle bars, each pair having outstanding legs projecting horizontally outward as shown in FIGURE 2.

The containers 10 may be stored below the floor 12 of the trailer as shown on FIGURE 2. A pair of containers are inverted and slid onto the slide rails 40 with the shoulders 37 of the base portion 16 being supported on the slide rails 40. A third container is slid in upright position between the two inverted containers, the shoulders 36 and lips 32 of the inverted containers supporting respectively the lips 32 and shoulders 36 of the upright container. It can thus be seen that the inverted containers are supported by the slide rails while each upright container is supported by the inverted containers disposed on opposite sides thereof.

When the containers 10 are used to store granular material, the lid 28 is opened and the material poured into the housing 22. The diagonal sides 26 of the housing have substantially the same slope as the normal angle of repose of a pile of the granular material which is to be stored and transported. As a result, when the material is poured into the container 10 it fills the entire container without the formation of any air spaces in which dust or moisture could accumulate. The lid 28 is then closed, the lock 34 moved into locking position, and the containers lifted and transported by means of a fork-lift vehicle into the interior of the trailer.

When the trailer reaches its destination, each container is removed in a similar manner, the lock 34 rotated away from the lid 28, and the entire container inverted, thus permitting the stored granular material to be removed therefrom. The empty containers may then be mounted below the floor of the trailer in the manner described above and as illustrated in FIGS. 1 and 2.

FIGS. 7 and 8 show a second embodiment of the container. The container includes a pallet portion 42 having projecting shoulders 44 and 46. The lower housing 48 of the container is fixed to the pallet and comprises outwardly sloping walls 50 each having a guide 52 fixed to its vertical upper edge. A pair of angle supports 54 are fixed to the walls 50 just below the guides 52.

The upper housing 56 comprises vertical sides 58 having rectangular blocks 60 fixed at spaced intervals therealong, and inwardly sloping walls 62 terminating in a horizontal hinged lid 64. The lid is provided with a lock 66. The lower portion of the vertical sides 58 include flanges 68 which are supported on the angle supports 54 when the container is assembled for loading as shown in FIG. 7. The blocks 60 then abut the vertical upper edge of the walls 50. The granular or liquid material may be placed in the container by opening the lid 64 and pouring the material into the interior of the container. The container may then be placed in the interior of the trailer and later unloaded and emptied, in the same manner as described with respect to the first embodiment.

When the container is to be stored, the upper housing 56 is removed, inverted and placed interiorly of the lower housing 48 as shown in FIG. 8. In this position the blocks 60 are supported on the angle supports 54. The containers may then be stocked below the floor of the trailer in the manner described with respect to the first embodiment of the container, with alternating inverted and upright containers. The shoulders 46 of the inverted containers are supported on the slide rails 40 while their shoulders 44 and guides 52 respectively support the guides 52 and shoulders 44 of the upright containers.

FIGURES 9 and 10 show a third embodiment of the container having a pallet portion 70 with projecting shoulders 72 and 74, a lower housing 76, and an upper housing 78. The lower housing 76 comprises outwardly sloping walls 78 with guides 80 fixed to the vertical upper edges thereof. The upper housing 78 includes a curved rubber cover 82 hingedly connected to the lower housing 76 adjacent the upper edges thereof. A metal strap 84 is fixed to the cover 82 at spaced intervals along its interior face. A lid portion 86 is hingedly mounted at the upper part of the cover 82 and is secured in place by a lock 88. Handles 90 are mounted on the surface of the cover 82.

When the container is used for storing material, the lid 86 is opened and the material placed inside. The containers are placed in the interior of the trailer as described above. The material is removed by inverting the container and opening the lid 86.

When the container is to be stored, the upper housing 78 is manually pushed down into the lower housing 76 as shown in FIG. 10. The containers are then stacked below the trailer bed in the same manner as described with respect to the containers shown in FIGURES 7 and 8.

In the embodiments of FIGURES 7–9, the end faces of the containers may be of any configuration provided the upper housing is adaptable to be disposed within the lower housing as in FIGURES 8 and 10.

Having thus described my invention, I claim:

1. A system of containers for use in conjunction with conventional load-carrying vehicles such as trailers, comprising:
   a plurality of containers having such a configuration to hold granular materials and the like to be placed in the interior of said trailer when loaded;
   and support means mounted below the floor of said trailer and adapted to support a plurality of inverted containers at spaced intervals, said inverted containers constructed and arranged as to support upright containers disposed therebetween.

2. The system set forth in claim 1 wherein said support means comprise slide rails mounted in parallel spaced relationship below said trailer floor, said slide rails adapted to support projecting edges on said inverted containers.

3. The system set forth in claim 2 wherein projecting edges on said upright containers are supported on projecting edges on said inverted containers.

4. A system of containers for use in conjunction with conventional load-carrying vehicles such as trailers, comprising:
   a plurality of containers each comprising a pallet including blocks mounted adjacent the edge of a base, a housing on said pallet, said base and housing extending beyond said blocks to form projections, a lid on said housing extending laterally to form projections, said housing being adapted to receive granular material and the like and to be placed when loaded in the interior of said trailer;
   and slide rails mounted below the trailer floor and adapted to hold said containers, when empty, in storage position, said slide rails being adapted to support the projections on said slide rails.

5. The system set forth in claim 4 wherein said slide rails support inverted containers at spaced intervals, the projections on said inverted containers being adapted to abut and support projections on upright containers, each disposed between a pair of inverted containers.

6. A system of containers for use in conjunction with conventional load-carrying vehicles such as trailers, comprising:
   a plurality of containers each comprised of sloping sidewalls, the base thereof being wider than the lid, the base and the lid extending laterally from the side walls to form projections, said container being adapted to receive granular material and the like to be placed, when loaded, in the interior of said trailer;
   and spaced parallel slide rails mounted below the trailer floor and adapted to abut and support said projections, so as to hold said containers, when empty, in storage position under said trailer.

7. A system of containers for use in conjunction with conventional load-carrying vehicles such as trailers, comprising:
   a plurality of containers each comprised of sloping side walls, the base thereof being wider than the lid, the base and the lid extending laterally from the side walls to form projections, said container being adapted to receive granular material and the like and to be placed, when loaded, in the interior of said trailer;
   and spaced parallel slide rails mounted below the trailer floor and adapted to abut and support the projections on inverted containers at equally spaced intervals along the lower face of the trailer floor, the projections on said inverted containers being adapted to abut and support the projections on upright containers, each disposed between a pair of inverted containers.

8. A system of containers for use in conjunction with conventional load-carrying vehicles such as trailers, comprising:

a plurality of containers each comprised of a pallet having a base portion projecting laterally beyond spaced blocks fixed thereto, a base fixed on said pallet and projecting laterally beyond said blocks, sidewalls sloping inwardly upwards towards a hinged lid projecting laterally beyond said walls, said container being adapted to receive granular material and the like and to be placed, when loaded, in the interior of said trailer;

and spaced parallel slide rails mounted below the trailer floor transversely to the length of said trailer, said slide rails supporting the projecting base portions of the pallets of inverted containers at equally spaced intervals, the projecting bases of the inverted containers supporting the projecting lid of upright containers, each disposed between a pair of inverted containers, and the projecting lids of said inverted containers supporting bases of said upright containers.

9. The system set forth in claim 6 wherein the slope of said side walls corresponds to the normal angle of repose of the granular material carried within the container.

10. A system of containers for use in conjunction with conventional load-carrying vehicles such as trailers, comprising:

a plurality of containers each comprised of a lower housing and upper housing, said upper housing adapted to be stored within said lower housing when the container is not loaded, said container being adapted to be filled with granular or similar material and placed, when loaded, in the interior of said trailer;

and support means mounted below the floor of said trailer and constructed and arranged as to releasably hold said containers, when empty, in position.

11. The system set forth in claim 10 wherein said upper housing is inverted in order to fit within said lower housing for storage.

12. The structure set forth in claim 10 wherein said upper housing is comprised of a flexible material and is manually forced down into the interior of the lower housing for storage.

13. The system set forth in claim 12 wherein the upper housing comprises a curved rubber cover hingedly connected to said lower housing at its edges and having metal straps spaced therealong.

14. The system set forth in claim 10 wherein inverted containers are supported in said slide rails at equally spaced intervals, each upright container being supported on and between a pair of inverted containers.

References Cited by the Examiner
UNITED STATES PATENTS

| | | | |
|---|---|---|---|
| 120,645 | 11/1871 | Holt | 224—42.41 |
| 1,453,362 | 5/1923 | Loveland | 224—42.41 X |
| 2,207,115 | 7/1940 | Carr | 211—134 X |
| 2,607,518 | 8/1952 | Cohen | 224—42.41 |
| 3,026,015 | 3/1962 | Severn. | |
| 3,127,089 | 3/1964 | Williams. | |

GERALD M. FORLENZA, *Primary Examiner.*

HUGO O. SCHULZ, *Examiner.*